United States Patent
Tilley

(10) Patent No.: US 6,666,628 B1
(45) Date of Patent: Dec. 23, 2003

(54) PNEUMATIC TANK FOR STORAGE AND HIGH VOLUME DISCHARGE OF PULVERULENT MATERIALS

(76) Inventor: E. Alvin Tilley, 16601 Blount La., Walker, LA (US) 70785-6212

(*) Notice: Subject to any disclaimer, the term of this patent is extended or adjusted under 35 U.S.C. 154(b) by 0 days.

(21) Appl. No.: 10/158,720

(22) Filed: May 30, 2002

(51) Int. Cl.[7] .............................................. B65G 53/12
(52) U.S. Cl. ......................... 406/146; 406/90; 406/137
(58) Field of Search .......................... 406/90, 137, 138, 406/142, 146

(56) References Cited

U.S. PATENT DOCUMENTS

| | | |
|---|---|---|
| 1,570,795 A | 1/1926 | Tainton |
| 1,759,983 A | 5/1930 | Houston |
| 2,915,339 A | 12/1959 | Lusted |
| 2,965,269 A | 12/1960 | Knutsen |
| 3,226,166 A | 12/1965 | Bertolini et al. |
| 4,088,373 A | 5/1978 | White |
| 4,459,070 A | 7/1984 | Bourgeois |
| 4,846,377 A | 7/1989 | Fix et al. |
| 5,018,909 A | 5/1991 | Crum et al. |
| 5,031,546 A | 7/1991 | Amos et al. |
| 6,299,387 B1 * | 10/2001 | Anderson .................. 406/198 |

FOREIGN PATENT DOCUMENTS

| | | |
|---|---|---|
| JP | 56043130 | 4/1981 |
| WO | WO 00/55073 | 9/2000 |

\* cited by examiner

Primary Examiner—Joseph A. Dillon
(74) Attorney, Agent, or Firm—David L. Ray

(57) ABSTRACT

A pneumatic storage tank for storing, transporting, and discharging pulverulent or powdered material or the like including a tank having a cylindrical side wall and upper and lower concave heads enclosing and sealing opposite ends of the cylindrical side wall, the tank adapted to be supported in a vertical position, a plurality of slope sheets within the tank, the slope sheets being sealed to the cylindrical side wall around the full circumference of the cylindrical side wall, the slope sheets being inclined downwardly from the cylindrical side wall to the central region of the tank adjacent the lower concave head of the tank, a plurality of air slides within the tank, the air slides disposed along the slope sheets between the slope sheets and extending from the cylindrical side wall of the tank downwardly toward the central region of the tank adjacent the lower concave head of the tank, wherein the slope sheets and the air slides separate the tank into an upper compartment and a lower compartment, an inlet pipe for providing the material to be stored therein into the upper compartment of the tank, a discharge pipe for removing the material from the upper compartment of the tank, the discharge line extending from a point adjacent to the slope sheets in the central region of the tank adjacent to the lower concave head of the tank, an air pipe positioned in the lower compartment of the tank, the air slides being adapted to release the air supplied thereto through the air slides into the upper compartment to suspend pulverulent material in the upper compartment, and an air nozzle located at the upper end of each of the air slides adjacent to the side wall of the tank, the air nozzle being adapted to direct air under superatmospheric pressure downward along the surface of the air slide to urge the pulverulent material downwardly from the side wall toward the central region of the tank.

9 Claims, 5 Drawing Sheets

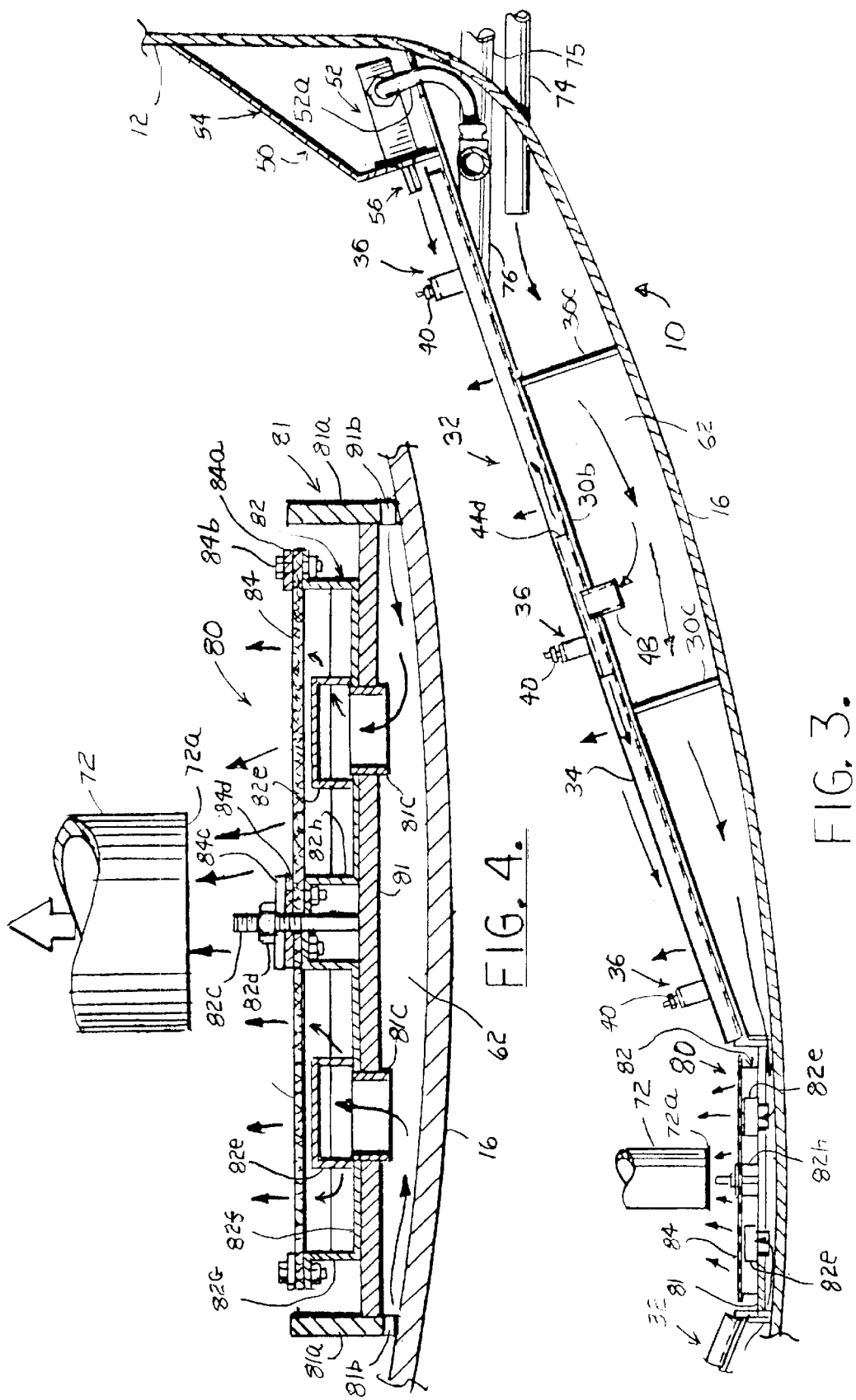

PNEUMATIC TANK FOR STORAGE AND HIGH VOLUME DISCHARGE OF PULVERULENT MATERIALS

BACKGROUND OF THE INVENTION

1. Field of the Invention

The present invention relates to tanks for storing and moving pulverulent or powdered material such as cement, drilling fluid additives such as barites, bentonite and the like, and pulverulent oil and gas well treatment materials used to increase production of oil wells by fracturing petroleum-containing geologic strata, and the like. In particular, the present invention is related to pneumatic tanks used for storing, transporting and discharging pulverulent material commonly used in petroleum and natural gas exploration and production.

2. Description of the Related Art

In the petroleum and natural gas exploration industry it is necessary to transport various pulverulent materials from onshore storage, manufacturing, mining, and storage facilities by barge or ship to marine inshore and offshore exploration and production locations. Some of these materials are very expensive, and many of the materials are difficult to unload from a ship or barge because the common gravity feed dump trucks used onshore cannot be utilized in a marine environment. Commonly, significant portions of these materials remain in the storage tank on the ship or barge in which they are transported due to difficulty encountered in removing all of the materials from the barge or other transport vessel at the marine production or exploration locations where the materials are being unloaded.

The storage and discharge tanks for pulverulent material of the prior art commonly are unable to discharge a large percentage of the material stored and transported in the tank. Such residue remains in the tank and travels with the tank back to the storage facility for the pulverulent material. The residue left in the tank greatly adds to the expense of transport and discharge of the pulverulent material.

Exemplary of the Patents of the related art are the following U.S. Pat. Nos.: 4,459,070; 4,088,373; 1,570,795; 1,759,983; 2,915,339; 2,965,269; 3,226,166; 4,846,377; 5,018,909; 5,031,546; WO55073A1 and JP56043130.

BRIEF SUMMARY OF THE INVENTION

In accordance with the present invention there is provided a pneumatic storage tank for storing, transporting, and discharging pulverulent or powdered material or the like including a tank having a cylindrical side wall and upper and lower concave heads enclosing and sealing opposite ends of the cylindrical side wall, the tank adapted to be supported in a vertical position, a plurality of slope sheets within the tank, the slope sheets being sealed to the cylindrical side wall around the full circumference of the cylindrical side wall, the slope sheets being inclined downwardly from the cylindrical side wall to the central region of the tank adjacent the lower concave head of the tank, a plurality of air slides within the tank, the air slides disposed along the slope sheets between the slope sheets and extending from the cylindrical side wall of the tank downwardly toward the central region of the tank adjacent the lower concave head of the tank, wherein the slope sheets and the air slides separate the tank into an upper compartment and a lower compartment, an inlet pipe for providing the material to be stored therein into the upper compartment of the tank, a discharge pipe for removing the material from the upper compartment of the tank, the discharge line extending from a point adjacent to the slope sheets in the central region of the tank adjacent to the lower concave head of the tank, an air pipe positioned in the lower compartment of the tank, the air slides being adapted to release the air supplied thereto through the air slides into the upper compartment to suspend pulverulent material in the upper compartment, and an air nozzle located at the upper end of each of the air slides adjacent to the side wall of the tank, the air nozzle being adapted to direct air under superatmospheric pressure downward along the surface of the air slide to urge the pulverulent material downwardly from the side wall toward the central region of the tank.

The pneumatic tank of the invention has the advantage of rapid removal of pulverulent material therefrom.

The pneumatic tank of the invention has the further advantage of discharging substantially all of the pulverulent material stored and transported therein.

BRIEF DESCRIPTION OF THE SEVERAL VIEWS OF THE DRAWINGS

FIG. 3 is a partly cross-sectional, partly cut-away view taken along lines 3—3 of FIG. 2;

FIG. 4 is an enlarged, partly cut-away, partly cross-sectional view taken of the center section of the pneumatic tank shown in FIG. 3.

DETAILED DESCRIPTION OF THE INVENTION

Figure 1:
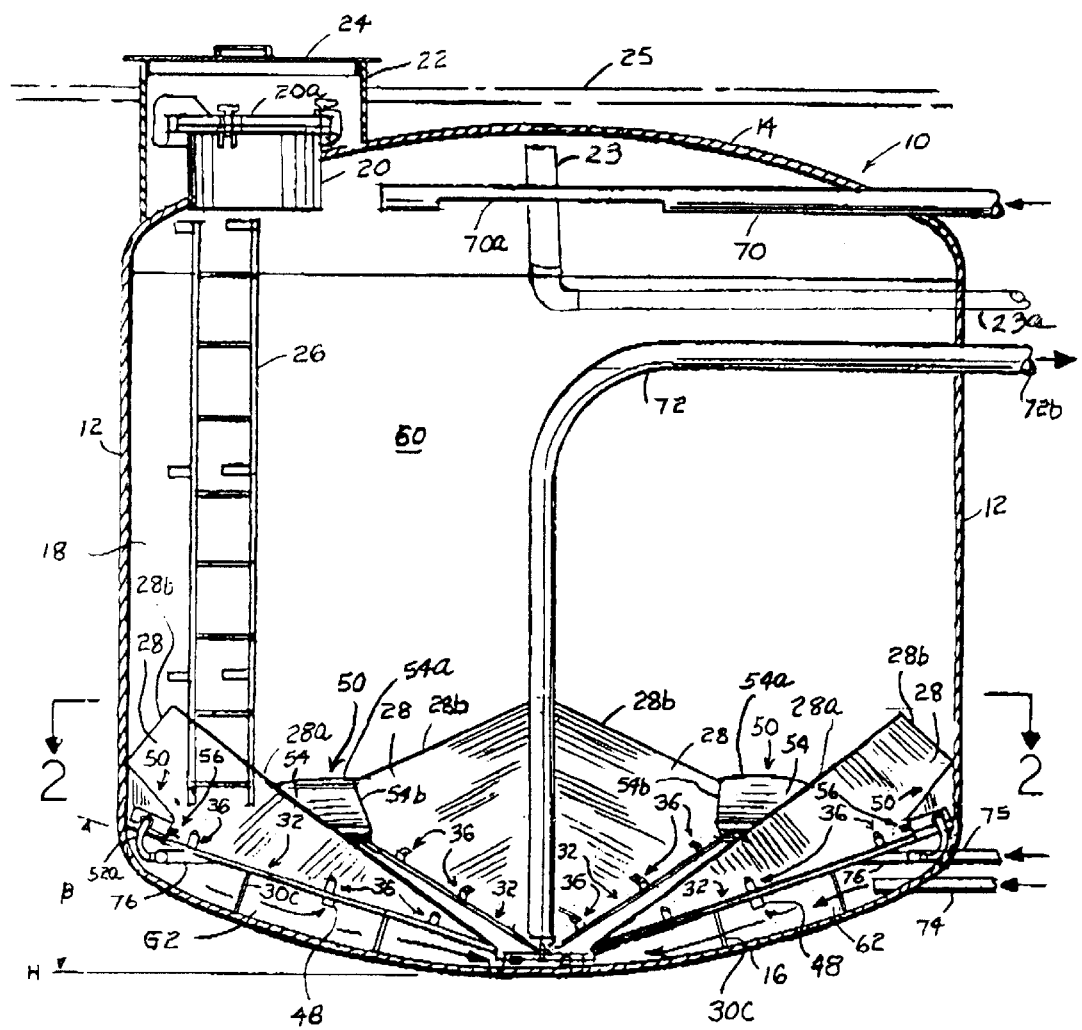
FIG. 1 is a cross-sectional, partly cut-away side elevation view of a preferred embodiment of the pneumatic tank of the invention.
Figure 2:
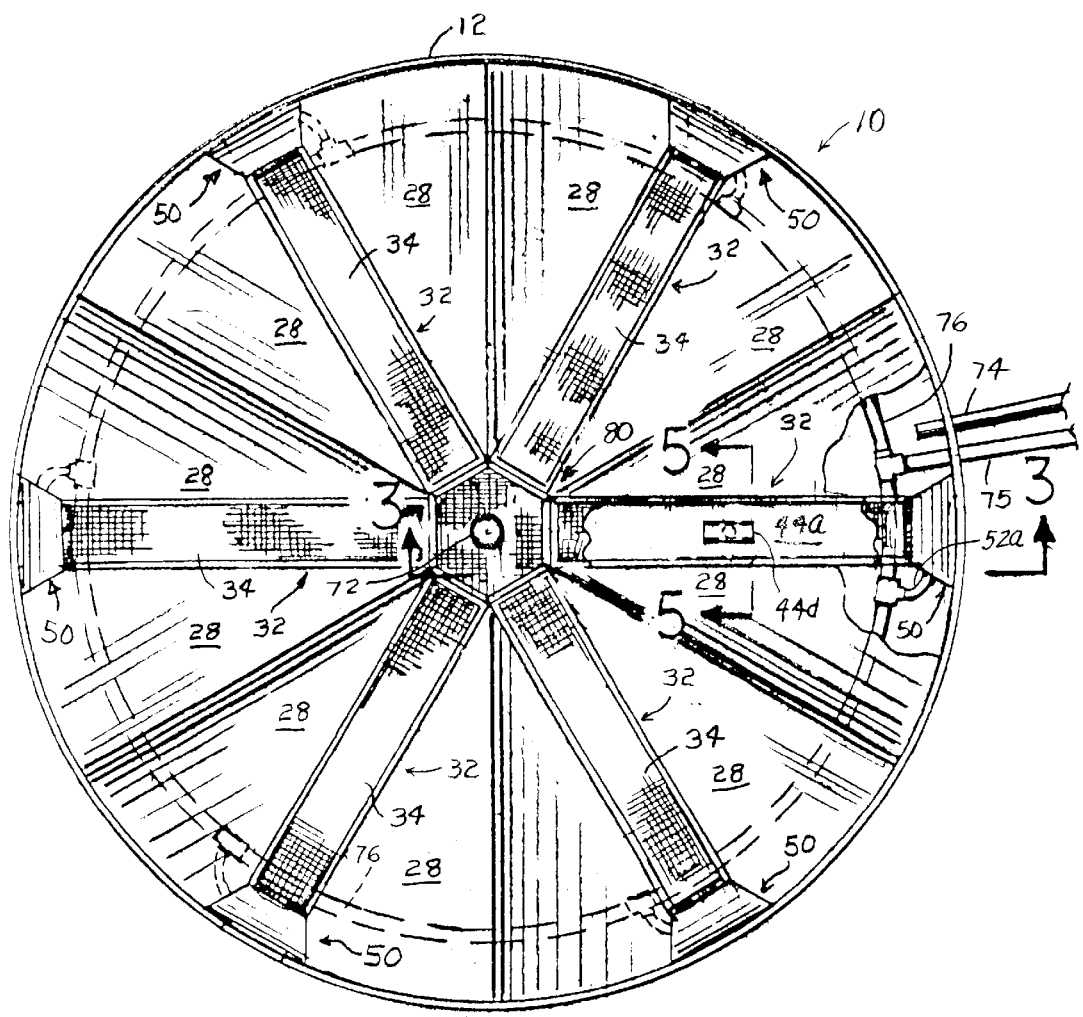
FIG. 2 is a partly cross-sectional, partly cut-away view taken along lines 2—2 of FIG. 1.

Referring now to the drawings, and in particular to FIG. 1, the pneumatic tank and system of the invention is generally indicated by the numeral 10. Tank 10 has vertical walls 12 and upper and lower concave heads 14 and 16, respectively, covering the ends of the vertical walls 12 and forming a closed chamber 18. Heads 14 and 16 are hermetically sealed to the walls 12 to enable tank 10 to maintain the internal pressure needed for operation of the tank discharge system. The upper head has a normally dosed manway 20 with hatch 20a surrounded by a coaming 22 with a lid 24.

Terminating inside head 14 is vent 23. Vent 23 extends from the interior of head 14 to the exterior of tank 10 at 23a. Vent 23 is opened by a valve (not shown) on vent 23 on the exterior of tank 10 at 23a when tank 10 is being filled, and is closed by the same valve when the tank 10 is being emptied by discharging pulverulent material through discharge line 72 in accordance with the invention. When tank 10 is being filled, manway 20, discharge line 72, and air lines 74 and 75 are closed. Preferably the end of vent 23a terminates in a conventional filtering system to prevent dust being vented during filling of tank 10 with pulverulent material from polluting the air in the vicinity of tank 10.

Tank 10 may be mounted in a ship or barge having deck 25. An access ladder 26 is provided beneath manway 20 and is attached to the inside of walls 12 to enable entry to the interior of tank 10.

Figure 5:
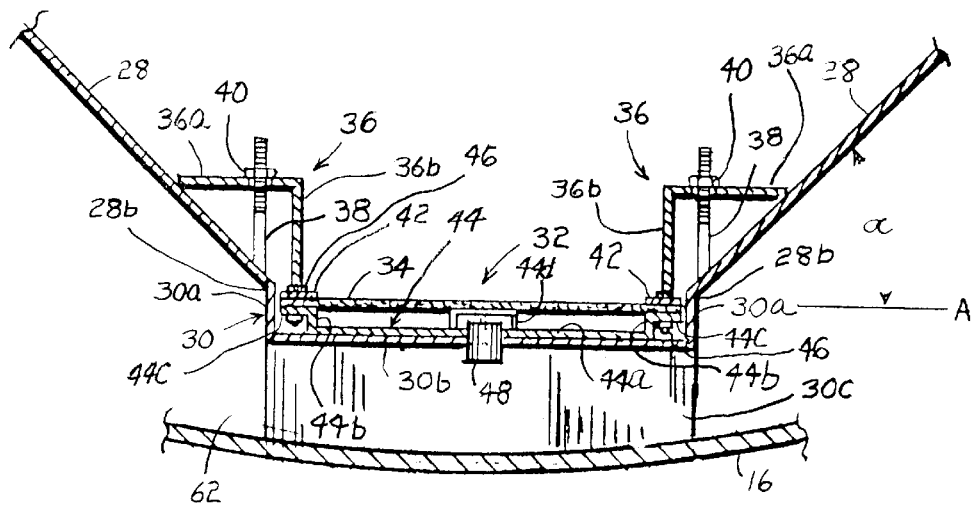
FIG. 5 is a cross-sectional, partly cut-away view taken along lines 5—5 of FIG. 2.

Inclined slope sheets 28 are connected to the lower portion of tank 10. The slope sheets 28 horizontally and vertically and are rigidly joined together at their upper edges 28a. As shown in FIG. 5, the slope sheets 28 are inclined at an angle a sufficient to enable the pulverulent material stored in tank 10 to slide down slope sheets 28 as is known in the art. Angle α may range from about 36 degrees to about 40 degrees. Preferably, angle α is about 38 degrees.

Slope sheets 28 are hermetically sealed at their outer edges 28b to vertical walls 12 to prevent pulverulent material from entering the area beneath slope sheets 28, and to provide structural support for slope sheets 28.

The bottom edges 28b of each slope sheet 28 are connected to rigid channels generally indicated by the numeral 30. As shown in FIG. 5, channels 30 have vertical sidewalls 30a extending upward from a flat rectangular bottom 30b. Bottom 30b has support bars 30c connected thereto and to lower head 16 to provide structural support.

As shown in FIG. 1 and in greater detail in FIG. 3, an air slide assembly generally indicated by the numeral 32 is located in each of the channels 30—30. Air slide assembly 32 has a conventional air permeable fabric 34 forming the upper surface of the air slide assembly 32. Air permeable fabric 34 mounted in air slide assembly 32 is inclined with respect to the horizontal axis H shown in FIG. 1 at an angle β sufficient to enable the pulverulent material stored in tank 10 to slide down fabric 34 as is known in the art. Angle β may range from about 18 degrees to about 25 degrees. Preferably, angle B is about 21.5 degrees.

Air slide assembly 32 has two L-shaped hold down lugs generally indicated by the numeral 36—36 shown in detail in FIG. 5 which are fastened with bolts 38 and nuts 40 to slope sheets 28. Bolts 38 are rigidly connected to the upper surface of slope sheets 28 near the bottom edge 28b of slope sheets 28 and extend vertically upward therefrom. L-shaped shoulders 36—36 have a horizontal leg 36a N rigidly connected to a vertical leg 36b. Vertical leg 36a has a retaining strip 42 connected to the bottom end thereof.

An air box generally indicated by the numeral 44 is located beneath air permeable fabric 34. Air box 44 has a flat generally rectangular base 44a which fits against the surface of bottom 30b of channel 30. Extending vertically upward from each outer edge of base 44a are shoulders 44a—44b. Shoulders 44a—44b have an upper horizontal retaining strip 44c connected thereto aligned with retaining strip 42 which receive the outer edges of air permeable fabric 34 therebetween. Nut and bolt assemblies 46—46 connect retaining strip 42 and 44c to secure air permeable fabric 34 therebetween. Base 44a has a generally rectangular air diffuser box 44d connected to the upper surface thereof for diffusing air under superatmospheric pressure entering air slide assembly 32 beneath air permeable fabric 34 through air conduit 48 as indicated by the arrow in FIG. 3. Air flows through air permeable fabric 34 as indicated by the arrows in FIG. 3 to suspend particles of pulverulent material stored in tank 10, thereby creating a material-air mixture which will be similar to a liquid in its flow characteristics to aid in movement of the pulverulent material stored in tank 10 downward along air slide assembly 32 toward the center of tank 10. Bolts 38 and nuts 40 enable air slide assembly 32 to be removed from slope sheets 28, and nut and bolt assemblies 46 enable air permeable fabric 34 to be installed or replaced.

An important feature of the invention is the provision of an air jet assembly generally indicated by the numeral 50. As shown in detail in FIGS. 6, 7, and 8, air jet assembly 50 has a generally rectangular air box generally indicated by the numeral 52 connected to a mounting plate assembly generally indicated by the numeral 53. Air box 52 receives air under superatmospheric pressure through conduit or hose 52a which extends through opening 31 in bottom 30b of channel 30.

Cover plate assembly 53 has a downwardly inclined top plate 54 which connected at its top edge 54a to wall 12 of tank 10 and at side edges 54b and 54c to slope sheets 28. Mounting plate assembly 53 has an end wall 54d integrally formed with top plate 54 which is preferably positioned perpendicularly to the surface of air permeable fabric 34.

Air box 52 has a tapered top plate 52b parallel to a tapered bottom plate 52c, two side walls 52d—52d, and an outer end wall 52e which are rigidly connected at their edges to form an air-tight box open at the front end. The inner open end of air box 52 has a lip 52f extending completely therearound which is connected to end wall 54d of top plate 54 by nut and bolt assemblies 52g.

A flexible elongated nozzle generally indicated by the numeral 56 is connected to the inner open end of air box 52. Nozzle 56 is composed of two elongated identical L-shaped flexible members 56a—56a connected adjacent to each other between lip 52f and end wall 54d of mounting plate 54 which extend substantially the entire width of air permeable fabric 34. End wall 54d has an elongated opening 54e therein for receipt of a portion of flexible members 56a—56a of nozzle 56.

Figure 6:
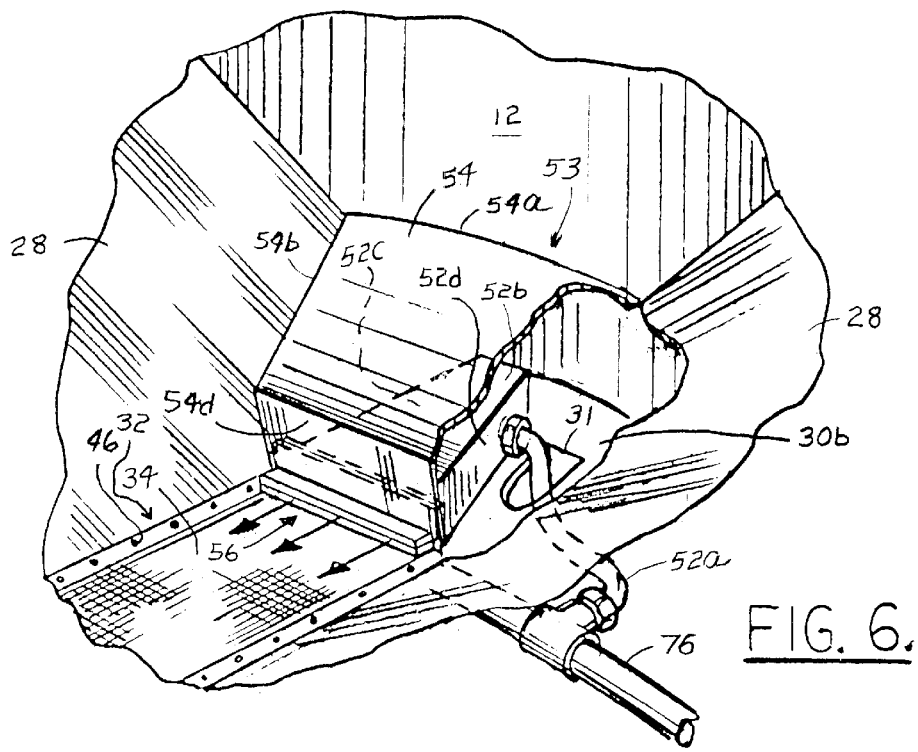
FIG. 6 is a perspective, partly cut-away view of a preferred embodiment of an air jet assembly of the invention.
Figure 7:
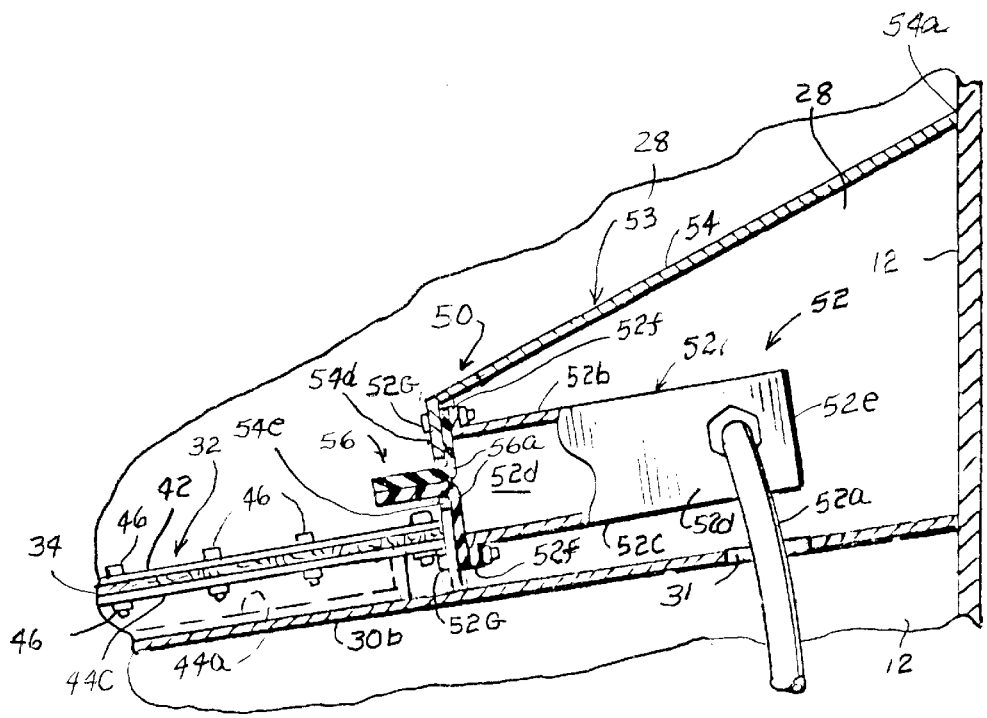
FIG. 7 is an enlarged, detailed view 6o a preferred embodiment of the air jet assembly of the invention.
Figure 8:
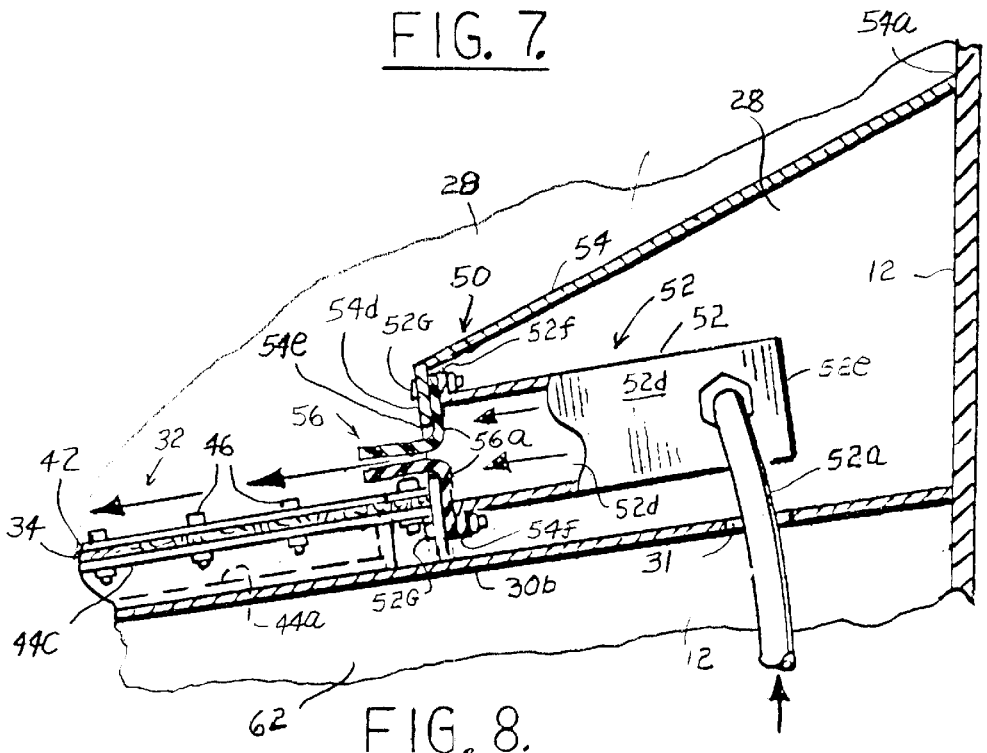
FIG. 8 is an enlarged, detailed view of a preferred embodiment of the air jet assembly of the invention.

Elongated nozzle 56 is preferred to approximate a laminar air flow along the entire width of fabric 34 to move pulverulent material suspended above air slide 32 down air slide 32 as indicated by the arrows in FIG. 6 and FIG. 8. As shown in FIG. 7, L-shaped flexible members 56a—56a are touching when air is not flowing there through. Nozzle 56 could be replaced if desired by a single conventional nozzle which sprays air through a single orifice, or by a plurality of such circular nozzles extending along the fill width of fabric 34.

The surface defined by slope sheets 28, channels 30, and air slide assemblies 32 creates a partition which separates tank 10 into an upper compartment 60 and a lower compartment 62. The upper compartment 60 contains the pulverulent material to be stored and discharged. The pulverulent material is loaded into tank 10 through inlet line 70 as shown in FIG. 1 having an opening 70a therein for enabling the pulverulent material to fall from inlet line 70 into tank 10. The inclination of slope sheets 28 and air slide assemblies 32 biases the pulverulent material in tank 10 toward the discharge line 72 and the area of the air discharge assembly generally indicated by the numeral 80 in the lower central portion of tank 10. Discharge line 72 has its intake end 72a located in the lower end of the center of upper compartment 60 of tank 10 to remove pulverulent material from the upper compartment 60 of tank 10 as indicated by the arrow in FIG. 4 and discharge the pulverulent material from the discharge end 72b of discharge line 72 as indicated by the arrow in FIG. 1.

As shown in FIGS. 1 and 3, the lower compartment 62 of tank 10 has a first air inlet line 74 for providing air under superatmospheric pressure to lower compartment 62 and a second inlet line 75 for providing air under superatmospheric pressure to air manifold 76. The air pressure of air supplied under superatmospheric through lines 74 and 75 is regulated to obtain maximum flow and discharge of pulverulent material through discharge line 72. It is important that the pressure of air under superatmospheric pressure flowing through line 74 is greater than the pressure of air under superatmospheric pressure flowing through line 75, preferably five pounds per square inch greater, to maintain air flow upward through air permeable fabric 34 to fluidize or suspend the pulverulent material in the tank. Air manifold 76 provides air under superatmospheric pressure from line 75 to nozzles 56 through conduit 52a and air box 52.

As shown in detail in FIG. 3, the preferred air discharge assembly 80 is located in the lower central portion of tank 10 and includes a hexagonal support plate generally indicated by the numeral 81 connected to the inner center surface of lower head 16. Hexagonal support plate 81 has six side walls 81a connected at their vertical edges and arranged hexagonally around the perimeter thereof, each of the side walls 81a being connected to the lower end of an individual air slide assembly 32. Openings 81b are provided in the bottom of each side wall 81a for admission of air under superatmospheric pressure in lower compartment 62 to the underside of hexagonal plate 81 as indicated by the arrows in FIGS. 3 and 4. Each of the side walls 81a is rigidly connected vertically to the inner surface of lower head 16 at their bottom horizontal edge and perpendicularly to an outer edge of hexagonal base plate 81b. Hexagonal base plate 81 has a plurality of conduits 81c therein for conveying air under superatmospheric pressure through base plate 81.

Air discharge assembly 80 preferably includes a hexagonally shaped air discharge box generally indicated by the numeral 82 connected to hexagonal base plate 81b by bolt 82c, which is rigidly connected to base plate 81b, and nut 82d. Air discharge box 82 has an air diffuser box 82e connected to air discharge box base plate 82f Air diffuser box 82e directs air therethrough beneath the entire lower surface of hexagonally shaped air permeable fabric 84. Air flows through air permeable fabric 84 as indicated by the arrows in FIGS. 3 and 4 to suspend particles of pulverulent material stored in tank 10, thereby creating a material-air mixture which will be similar to a liquid in its flow characteristics to aid in discharge of the pulverulent material through discharge line 72. Air discharge box 82 has six generally rectangular side walls 82g—82g extending perpendicularly upward from base plate 82f and joined at their vertical edges. A shoulder 82g extends horizontally from the upper edges of side walls 82g—82g which supports the outer edge of hexagonally shaped air permeable fabric 84. A hexagonal shape rigid retaining ring 84a is located over the top surface of the outer edge of hexagonally shaped air permeable fabric 84, and nut and bolt assemblies 84b connect retaining ring 84a and the outer edge of air permeable fabric 84 to shoulder 82g of air discharge box 82.

If desired, air discharge box 82, fabric 84, diffuser box 82e, post 82h, and bolt 82c could be omitted, although they are preferred for optimum discharge rate.

At the center of air discharge box 82 is a hollow cylindrical post 82h closed at the top end which is connected to base plate 82f and extends vertically upward therefrom. The center of air permeable fabric 84 rests against the closed top end of post 82h and is held in place by bolt 82c, nut 82d, and washers 84c and 84d.

To discharge pulverulent material from tank 10, hatch 20a is closed, and air is introduced through inlet lines 74 and 75. The pressure of air provided in line 74 may range from about 80 psig to about 90 psig; preferably the pressure provided in line 75 may range from about 75 psig to about 80 psig.

Pressure provided in line 75 may range from about 80 psig to about 90 psig; preferably the pressure provided in line 75 may range from about 75 psig to about 80 psig. When a pressure of about 80 psig is reached in tank 10, discharge line 70 is opened. The pulverulent material in tank 10 will have become suspended in air and will assume some of the characteristics of water and will seek its own level. Air above this level will apply pressure on the top of the mass of material-air mixture, and the mixture will flow to air discharge assembly 80. The air pressure in lines 74 and 75 is regulated to maintain the desired pressure for maximum discharge of pulverulent material through discharge line 72. In such fluidized condition, and under pressure, the pulverulent material in tank 10 will flow through discharge line 72. Flow rates from discharge line 72 will depend on the pressure in lines 74 and 75 and other factors such as the density of the material and the consequent friction resistance, air volume, line sizes, bends in the line, and the like. The vertical walls, slope sheets, and air slides are designed so that all of the pulverulent material will flow to the lower center of tank 10 for discharge through discharge line 72. The entire discharge line 72, from the tank 10 to the point of discharge, will be pressurized and the friction resistance of the pulverulent material flowing through discharge line 72 will assist in maintaining the desired pressure on the tank. The air above the material-air mixture level will exert pressure on the mixture constantly urging the mixture against the slope sheets 28.

Although the preferred embodiments of the invention have been described in detail above, it should be understood that the invention is in no sense limited thereby, and its scope is to be determined by that of the following claims:

What is claimed is:

1. A pneumatic storage tank for storing, transporting, and discharging pulverulent material comprising:

a. a tank having a cylindrical side wall and upper and lower concave heads enclosing and sealing opposite ends of said cylindrical side wall, said tank adapted to be supported in a vertical position;

b. a plurality of slope sheets within said tank, said slope sheets being sealed to said cylindrical side wall around the full circumference of said cylindrical side wall, said slope sheets being inclined downwardly from said cylindrical side wall to the central region of said tank adjacent said lower concave head of said tank;

c. a plurality of air slides within said tank, said air slides disposed along said slope sheets between said slope sheets and extending from said cylindrical side wall of said tank downwardly toward the central region of said tank adjacent said lower concave head of said tank, wherein said slope sheets and said air slides separate said tank into an upper compartment, said plurality of slope sheets and said plurality of air slides grouped so as to from channels and a lower compartment;

d. an inlet pipe for providing said material to be stored therein into said upper compartment of said tank;

e. a discharge pipe which removes said material from said upper compartment of said tank, said discharge line extending from a point adjacent to said slope sheets in said central region of said tank adjacent to said lower concave head of said tank;

f. an air pipe positioned in said lower compartment of said tank, said air pipe having an air supply connected thereto for supplying air under superatmospheric pressure to said lower compartment of said tank, said air slides being adapted to release said air supplied to said lower compartment through said air slides into said upper compartment to suspend pulverulent material in said upper compartment; and g. an air nozzle located at the upper end of each of said air slides adjacent to said side wall of said tank, said air nozzle being adapted to direct a layer of air under superatmospheric pressure downward along each of said channels the surface of said air slide to urge said pulverulent material downwardly from said side wall toward said central region of said tank.

2. The pneumatic storage tank of claim 1 wherein the lower end of each of said slope sheets is connected to an air discharge assembly.

3. The pneumatic storage tank of claim 2 wherein said air discharge assembly is adapted to release air into said upper compartment to suspend pulverulent material in said upper compartment.

4. The pneumatic storage tank of claim 3 wherein said air discharge assembly has an air permeable surface through which air under superatmospheric pressure is released.

5. The pneumatic storage tank of claim 4 wherein air under superatmospheric pressure in said lower compartment is released through said air permeable surface into said upper compartment.

6. The pneumatic storage tank of claim 1 wherein each of said air slides has an air permeable surface through which air under superatmospheric pressure is released.

7. The pneumatic storage tank of claim 6 wherein air under superatmospheric pressure in said lower compartment is released through said air permeable surface into said upper compartment.

8. The pneumatic storage tank of claim 1 wherein said air nozzle has an elongated discharge opening.

9. The pneumatic storage tank of claim 8 wherein said air nozzle extends substantially the entire width of said air slide.

* * * * *